United States Patent
Silverstein et al.

(10) Patent No.: US 12,423,922 B2
(45) Date of Patent: Sep. 23, 2025

(54) ITERATIVE VIRTUAL REALITY MODELING AMELIORATION FOR THREE-DIMENSIONAL TO-BE-PRINTED OBJECTS AND VIRTUAL REALITY FILAMENT SECTIONS

(71) Applicant: INTERNATIONAL BUSINESS MACHINES CORPORATION, Armonk, NY (US)

(72) Inventors: Zachary A. Silverstein, Georgetown, TX (US); Jeremy R. Fox, Georgetown, TX (US); Todd Russell Whitman, Bethany, CT (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 18/053,398

(22) Filed: Nov. 8, 2022

(65) Prior Publication Data

US 2024/0153215 A1 May 9, 2024

(51) Int. Cl.
*G06T 19/00* (2011.01)
*B29C 64/386* (2017.01)
*B33Y 50/00* (2015.01)
*G06T 19/20* (2011.01)
*G06V 10/70* (2022.01)

(52) U.S. Cl.
CPC .......... *G06T 19/006* (2013.01); *B29C 64/386* (2017.08); *B33Y 50/00* (2014.12); *G06T 19/20* (2013.01); *G06V 10/70* (2022.01); *G06T 2219/2021* (2013.01)

(58) Field of Classification Search
None
See application file for complete search history.

(56) References Cited

U.S. PATENT DOCUMENTS

| 10,216,738 B1 | 2/2019 | Cronin |
| 10,279,543 B1 * | 5/2019 | Woychik ............... B29C 64/153 |
| 2014/0336808 A1 | 11/2014 | Taylor et al. |
| 2018/0059644 A1 | 3/2018 | Lection |

(Continued)

FOREIGN PATENT DOCUMENTS

CN 107443751 A 12/2017

OTHER PUBLICATIONS

Ceruti et al., "Augmented vision and interactive monitoring in 3D printing process", Received: Jul. 5, 2016 / Accepted: Aug. 22, 2016 / Published online: Sep. 3, 2016. (Year: 2016).*

(Continued)

*Primary Examiner* — Saptarshi Mazumder
(74) *Attorney, Agent, or Firm* — Robert D. Bean (57) ABSTRACT

According to one embodiment, a method, computer system, and computer program product for iteratively improving a virtual model of an object to be printed in a mixed reality environment is provided. The present invention may include rendering the virtual model within the mixed-reality environment; monitoring interactions between a user and the virtual model within the mixed-reality environment; predicting one or more deficiencies in the physical object based on the monitoring; suggesting one or more edits of the virtual model to the user to address the one or more predicted deficiencies; and integrating the one or more edits into the virtual model.

20 Claims, 2 Drawing Sheets

(56) References Cited

U.S. PATENT DOCUMENTS

| | | | |
|---|---|---|---|
| 2018/0144516 A1 | 5/2018 | Pri-Tal | |
| 2018/0284692 A1 | 10/2018 | Kline | |
| 2021/0166486 A1* | 6/2021 | Kim | G06F 3/017 |
| 2021/0365108 A1* | 11/2021 | Burns | G06F 3/013 |
| 2022/0032548 A1 | 2/2022 | Goyal | |

OTHER PUBLICATIONS

Wang et al. "Manufacture Assembly Fault Detection Method based on Deep Learning and Mixed Reality" Proceeding of the IEEE International Conference on Information and Automation Wuyi Mountain, China, Aug. 2018, (Year: 2018).*

Baron, "How Digital Twins Will Revolutionize 3D Manufacturing," All3DP Pro [online], Feb. 26, 2021 [accessed on Jul. 29, 2022], 13 pages, Retrieved from the Internet: <URL: https://all3dp.com/1/digital-twins-in-3d-manufacturing/.

Disclosed Anonymously, "A Method and System for Enabling 3D Printing with Feedback and Modification in VR," IP.com, Apr. 17, 2018, 3 pages, IP.com No. IPCOM000253627D, Retrieved from the Internet: <URL: https://ip.com/IPCOM/000253627>.

Kantaros, et al., "3D Printing and Implementation of Digital Twins: Current Trends and Limitations," Applied System Innovation [journal], 2022, 13 pages, vol. 5, No. 1, Article 7, DOI: 10.3390/asi5010007, Retrieved from the Internet: <URL: https://www.mdpi.com/2571-5577/5/1/7>.

Market Watch, "Virtual and Augmented Reality Market Research (2022-2028): In-Depth Assessment of the Growth and Other Aspects," Market Watch [press release], Mar. 1, 2022 [accessed on Jul. 19, 2022], 7 pages, Wayback Machine, Retrieved from the Internet: <URL: https://www.marketwatch.com/press-release/virtual-and-augmented-reality-market-research-2022-2028-in-depth-assessment-of-the-growth-and-other-aspects-2022-03-01?tesla=y>.

Markets and Markets, "3D Printing Market Size, Growth, Trend and Forecast to 2023—By MarketsandMarkets," Markets and Markets [online], Sep. 28, 2018 [accessed on Jul. 19, 2022], 5 pages, Retrieved from the Internet: <URL: https://www.prnewswire.com/news-releases/3d-printing-market-size-growth-trend-and-forecast-to-2023-by-marketsandmarkets-896443013.html>.

Okutani, et al., "Stereoscopic Capture in Projection Mapping," IEEE Access, 2018, pp. 65894-65900, vol. 6, Digital Object Identifier 10.1109/ACCESS.2018.2875905, Retrieved from the Internet: <URL: https://ieeexplore.ieee.org/document/8491263>.

Pappu, et al., "Haptic interaction with holographic video images", Practical Holography XII [book], 1998, pp. 38-45, vol. 3293, SPIE Digital Library, DOI: 10.1117/12.303665, Retrieved from the Internet: <URL: https://doi.org/10.1117/12.303665>.

Screen captures from YouTube video clip entitled "3D Printing from Virtual Reality!," 4 pages, uploaded on Nov. 1, 2016 by Make Anything, Retrieved from the Internet: <URL: https://www.youtube.com/watch?v=PViW68-hbTM>.

\* cited by examiner

ITERATIVE VIRTUAL REALITY MODELING AMELIORATION FOR THREE-DIMENSIONAL TO-BE-PRINTED OBJECTS AND VIRTUAL REALITY FILAMENT SECTIONS

BACKGROUND

The present invention relates, generally, to the field of computing, and more particularly to three-dimensional (3D) printing.

The field of three-dimensional (3D) printing encompasses a variety of processes whereby three-dimensional objects are constructed by depositing, joining or solidifying layers of material. These processes are controlled by a computer, which constructs the object according to a digital model, such as a CAD model or 3D model. One of the key advantages of 3D printing is the ability to produce very complex shapes or geometries that would be otherwise impossible to construct by hand, including hollow parts or parts with internal truss structures to reduce weight. As the precision, consistency, and material range of 3D printing increases, so too does the range of applications, from functional or aesthetic prototyping to industrial production, health, and education.

SUMMARY

According to one embodiment, a method, computer system, and computer program product for iteratively improving a virtual model of an object to be printed in a mixed reality environment is provided. The present invention may include rendering the virtual model within the mixed-reality environment; monitoring interactions between a user and the virtual model within the mixed-reality environment; predicting one or more deficiencies in the physical object based on the monitoring; suggesting one or more edits of the virtual model to the user to address the one or more predicted deficiencies; and integrating the one or more edits into the virtual model.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to three-dimensional (3D) printing. The following described exemplary embodiments provide a system, method, and program product to, among other things, render a 3D model of a physical object in mixed reality, predict performance of the object by simulating the usage context of the object, edit the 3D model based on the prediction, and print the object based on the edited 3D model.

As previously described, the field of three-dimensional (3D) printing encompasses a variety of processes whereby three-dimensional objects are constructed by depositing and joining or solidifying layers of material. These processes are controlled by a computer, which constructs the object according to a digital model, such as a CAD model or 3D model. There are several different types of 3D printing methods, which work with different materials and achieve varying levels of quality. A common method is fused filament fabrication, wherein a continuous thread of thermoplastic material is fed from a large spool through a computer-controlled extruder head of a 3D printer which melts the filament and deposits it in a molten state, at which point it cools and hardens. Other methods include photopolymerisation, which deposits successive layers of material such as chemical monomers and oligomers on a substrate and then employs photochemical processes to cross-link the deposited material into solid polymers, and powder sintering, which deposits successive layers of powdered material such as nylon or polyamide and heats the powdered material with a laser, binding it together into a solid structure.

One challenge associated with 3D printing is that even with access to a model of the object to be printed, a user may not always know whether the 3D printed object will look and function as intended. As such, it is often necessary to print out the 3D object before one can verify that the object looks and functions as desired; the object doesn't look or function as desired, the user may have to go back to the drawing board and edit the model or find another model entirely. Additionally, sometimes a 3D object can appear perfectly serviceable upon printing, but once put to its intended use, deficiencies in the object's performance and/or improvements to the design of the object may become apparent. Printing new objects after each design iteration is wasteful, time-consuming, frustrating, and adds unnecessary expense.

Mixed reality represents the technology of merging real and virtual worlds such that physical and digital objects co-exist and interact in real time. Mixed reality does not exclusively take place in either the physical or virtual worlds but is a hybrid of reality and virtual reality; as such, mixed reality describes everything in the reality-virtuality continuum except for the two extremes, namely purely physical environments, and purely virtual environments. Accordingly, mixed reality includes augmented reality (AR) and virtual reality (VR). Augmented reality is a modern computing technology that uses software to generate images, sounds, haptic feedback, and other sensations which are integrated into a real-world environment to create a hybrid augmented reality environment, comprising both virtual and real-world elements. Virtual reality is a modern computing technology that creates a virtual environment that fully replaces the physical environment, such that a user experiencing a virtual reality environment cannot see any objects or elements of the physical world; however, the virtual reality environment is anchored to real-world locations, such that the movement of players, virtual objects, virtual environmental effects and elements all occur relative to corresponding locations in the physical environment. Augmented reality is distinct from virtual reality in that an augmented reality environment augments the physical environment by overlaying virtual elements onto the physical environment, whereas a virtual reality environment fully replaces the physical environment with a virtual environment to completely immerse the user in a computer-generated world. In other words, a user within a virtual reality environment cannot see any real-world objects or environments, while a user within an augmented reality environment can see both the physical environment and virtual elements.

Mixed reality stands to compliment the field of 3D printing by allowing digital models of physical objects to be rendered in a mixed-reality environment where users can see, edit, and manipulate the virtual 3D object before it is printed. Furthermore, mixed reality offers the unique capability to enable users to personally interact with a digital model of the physical object prior to that object's creation; this in turn enables the system to replicate the context and environment that a physical object is likely to encounter in the course of its intended use, and enables a user to replicate user interactions that the physical object is likely to encounter in the course of its intended use by simulating those contextual factors for the digital model. In so doing, a system may predict deficiencies or potential improvements that could be addressed by editing the digital model, folding those edits into the digital model, and assessing the effects of the edits, all prior to the creation of the physical object.

As such, it may be advantageous to, among other things, implement a system that utilizes mixed reality and 3D printing together to render a virtual model of a physical object in mixed reality, subject the virtual model to simulated forces, contexts, environments, et cetera that the physical object is likely to encounter in the course of its use, identify potential improvements in the structure of the physical object, incorporate those improvements into the design of the physical object via the digital model, and assess the efficacy of those improvements. Therefore, the present embodiment has the capacity to improve the technical field of three-dimensional (3D) printing by automatically identifying improvements to an object, allowing users to see and edit an accurate simulation of the finished appearance of the physical object, and by enabling iterative improvement of a physical object prior to the creation of the object, thereby reducing or eliminating the material waste, time, expense, frustration, et cetera of printing a new physical object for successive iterations of the object's functional and/or aesthetic design.

According to one embodiment, the invention is a method of rendering a virtual model of an object to be printed in a mixed reality environment, predicting a usage performance of the object, suggesting edits to the virtual model to one or more users participating in the mixed reality environment based on the predicted usage performance, integrating edits into the virtual model, and printing the object based on the edited virtual model.

In some embodiments of the invention, the object to be printed, or physical object, may be an object that a user wishes to print utilizing a specialized 3D printer. The physical object may be associated with a virtual model; printing may entail converting a virtual model into a physical object through a process of depositing successive layers of material on top of each other in accordance with the virtual model to create a three-dimensional object. The object may be any tangible object that can be created through 3D printing, or in other words any object that can be created by depositing successive layers of hardening material; such objects may range from action figures and prototype machine parts to entire buildings. The objects may be created from a range of materials that may be controllably rendered plastic and moldable for a deposition and which can be cured or hardened into a rigid final shape once deposited. These materials may include, for example, polymers such as polyactic acid, acronitrile butadiene styrene, polyethylene terephthalate, polyurethane, and carbon fibers; metals such as steel and nickel-chromium; and ceramics such as clay and concrete.

In some embodiments of the invention, the virtual model may be a mathematical coordinate-based representation of any surface, both interior and exterior, of the physical object in three dimensions; in other words, the virtual model comprises a collection of points in 3D space connected by various geometric entities such as triangles, lines, curved surfaces, et cetera, which together create a faithful digital recreation of the physical object. The surfaces may be further defined with texture mapping to more accurately recreate the aesthetic properties of the physical object. The virtual model may further be "sliced" into a number of thin horizontal layers; the horizontal layers may represent the number of layers of material that must be deposited to create the physical object, and the thickness of these horizontal layers may correspond to a deposition material associated with the object and employed by the 3D printer to create the object. For example, the layers of a virtual model of a house may be thicker than the layers of a virtual model of an action figure, because the concrete used to make the house may be more thickly deposited than the thermoplastic used to make the action figure. In some embodiments of the invention, for example where the object comprises multiple separate parts, such as a toy truck with wheels capable of rotation, the model may render the parts as separate virtual objects which can move independently relative to each other.

In some embodiments of the invention, the virtual model may comprise metadata comprising additional information which pertains to the procedural process of converting the virtual model to a physical model via printing. The metadata may include, for example, data fields indicating the types and/or specific models of 3D printers capable of printing the physical object to which the virtual model corresponds, and/or data fields indicating the materials from which the 3D object could or should preferably be printed. The metadata may include data fields identifying the usage context of the physical object; the usage context may be information describing the aspects relating to or surrounding the physical object's performance of its intended function. In other words, the usage context may comprise the purpose or function of the object, requirements that the object must meet to perform its function, the general environment within which the object is intended to function, machines of which the object is a component or is designed to interoperate, objects or conditions within that environment likely or intended to interact with the object, materials within the environment that the object is likely or intended to contact, how the object may be moved by interaction with a human user, interoperation with machines or machine components, application of natural or man-made forces, et cetera. The usage context may comprise information from which risks or potential risks incurred through use of the physical object may be inferred, such as historical wear patterns on similar objects, areas of the object likely to come into contact with human users, strength of structural members of the object, sharpness of protruding features of the object, areas of the object that might become hot, et cetera. "Intended function," as used herein, may describe a use to which the user intends to put the physical object, and/or the use which the author of the digital model envisioned for the physical object. For example, the metadata may identify the digital model of a remote-controlled aircraft hull as being intended for flight. The usage context may be pre-provided by a user, service, program, or other agent, and/or could be retrieved from a repository. In some embodiments, for example where usage context is not available, the system may prompt the user to provide the usage context of the physical object. In some embodiments of the invention, the system may prompt the user to provide the name of the object and may subsequently look up the object in the predetermined list and retrieve the associated usage context.

In some embodiments of the invention, the mixed reality environment may be hybrid environment comprising both physical and virtual elements. The mixed reality environment may comprise a hybrid physical-virtual world which one or more users may enter, see, move around in, interact with, et cetera through the medium of a mixed-reality device. All users in a single mixed-reality environment may be able to see and/or interact with the same virtual objects and virtual elements and may interact with virtual representations of each other. The mixed reality environment may include augmented reality environments wherein generated images, sounds, haptic feedback, and other sensations are integrated into a real-world environment to create a hybrid augmented reality environment, comprising both virtual and real-world elements. The mixed reality environment may include virtual reality environments which fully replace the physical environment with virtual elements, such that a user experiencing a virtual reality environment cannot see any objects or elements of the physical world; however, the virtual reality environments are anchored to real-world locations, such that the movement of users, virtual objects, virtual environmental effects and elements all occur relative to corresponding locations in the physical environment.

The mixed reality device may be any device or combination of devices enabled to record real-world information that the mixed reality program may overlay with computer-generated perceptual elements to create the mixed-reality environment; the mixed reality device may further record the actions, position, movements, et cetera of the user, to track the user's movement within and interactions with the mixed reality environment. The mixed reality device may display the mixed reality environment to the user. The mixed reality device may be equipped with or comprise a number of sensors such as a camera, microphone, accelerometer, et cetera, and these sensors and/or may be equipped with or comprise a number of user interface devices such as displays, touchscreens, speakers, et cetera. One or more of the sensors may be capable of capturing biometric data and may accordingly be herein referred to as biometric sensors or biosensors. In some embodiments, the mixed reality device may be a headset that is worn by the viewer.

In some embodiments of the invention, the system may render the virtual model of the object to be printed in a mixed reality environment. In some embodiments of the invention, the mixed-reality environment may comprise one or more copies of the virtual model. In some embodiments of the invention, the virtual model may be manipulated by any participating users employing interface devices such as controllers and may be increased or reduced in size. The virtual model may be visually separated into its component layers or slices to allow users to see the internal surfaces and structures of the virtual model, for example by manipulating or pulling out individual layers or by spacing out the layers to create an "exploded" view of the virtual model. In some embodiments, users may create a copy of the virtual model, which may be updated to reflect all edits made to the virtual model or all copies of the virtual model by other users in real time or near-real-time. In some embodiments, the system may store one or more versions of the virtual model, where each version represents edits made to the virtual model and/or copies of the virtual model within a discrete segment of time and/or by a specific user or group of users.

In some embodiments of the invention, the system may modify the mixed-reality environment with one or more virtual elements comprising a usage context associated with the object. The system may retrieve usage context from a pre-provided document. The system may infer the intended usage context of the object from the name of the object by matching the name of the object against a pre-provided database which comprises a list of known objects and the usage context associated with their use. In an example, the digital model may be titled "garden trowel." The system may match the name "garden trowel" against a list of objects and retrieve the associated usage context, which may comprise the intended use of the garden trowel as digging in soil, and the environment as a garden comprising layers of soil and rocks. The system may, responsive to identifying the usage context, modify the virtual environment to simulate the usage context of the physical object. For example, where the physical object is a component of a larger machine, the system may model the larger machine in the mixed-reality environment as a virtual element. In another example, where the physical object is a handheld mining tool, the system may model virtual elements such as a cave and/or rocky terrain in the mixed-reality environment.

In some embodiments of the invention, the system may allow users within the mixed-reality environment to select the material or materials that the physical object will be created from during the 3D printing process; the system may dynamically update the appearance of the virtual model to reflect the finished appearance of the physical object based on the selected material or materials. In some embodiments of the invention, the system may allow users to select the type and/or model of 3D printer, and/or the type of 3D printing process employed in the creation of the physical object; the system may update the 3D model to represent the specific deposition pattern associated with the particular selected 3D printing method or printer, which may be unique to each type of 3D printer based on the aperture size, movement pattern, deposition rate, et cetera utilized by the 3D printer, and/or may be unique to the type of 3D printing method based on the hardening method, material properties, et cetera.

In some embodiments of the invention, the system may monitor how the user or user interacts with the virtual model within the mixed reality environment. The system may, in some embodiments of the invention, request that a user interact with or employ the tool in the manner that it is designed to be interacted with or employed in carrying out its function, for example through audible, graphical, and/or textual prompts overlaid onto the user's vision within the mixed reality environment. The system may monitor the movement of the user by tracking the user's movements via microlocation data from sensors integrated into the mixed reality device and track the location and movement of the virtual model in relation to the user for at least the duration of time that the user is holding and/or regularly interacting with the virtual model. The system may monitor where and how the user holds, touches, or otherwise interacts with the virtual model, what surfaces, objects and materials in the environment the virtual model comes into contact with, the force with which the model is moved and/or collides with other objects or surfaces in the environment, effects of wind and air resistance on the virtual models, et cetera.

In some embodiments of the invention, the system may predict deficiencies in the object by monitoring the interactions between the user or users and the virtual model in the mixed reality environment. The system may identify risks to the safety of human operators, for example by identifying potential safety hazards such as sharp edges or moving parts of the virtual model that are within a threshold distance of a region of the virtual model where the system observes the user to hold or interact with the virtual model. The system may identify weaknesses in structural elements of the invention, for example by simulating the forces at work on the virtual model during its intended use and compare those forces against the strength of the materials and structures comprising the virtual model. The system may identify drawbacks in the performance of the virtual model, such as where the user fails to execute the intended function; for example, if the virtual model is a pickaxe which collides with a mine ceiling and does not have room to swing in a standard-sized mining shaft, or repeatedly slips out of the user's hands, or is not pointed enough to concentrate sufficient force from a swing to crack the material it strikes. The safety risks, weaknesses, performance drawbacks, et cetera identified in the virtual model may be collectively referred to as deficiencies. The system may use artificial intelligence in identifying the deficiencies by utilizing a machine learning model to ingest the data gathered by monitoring the user's interactions with the virtual model in the mixed reality environment; the machine learning model may be trained to identify connections between the usage context of the object, the interactions between the users and the virtual model, and deficiencies which have been identified in the past. The machine learning model may be trained on a knowledge corpus comprising historical objects and their usage context, user interaction data, and identified deficiencies. The system may utilize a different machine learning model for each object or class of similar objects associated with the virtual model.

In some embodiments of the invention, the system may suggest edits to the virtual model to one or more users participating in the mixed reality environment based on the identified deficiencies. The system may employ the machine learning model to identify connections between the identified deficiencies and structures, materials, design changes, and other potential solutions that have historically addressed the identified deficiencies in the past, for example with respect to similar objects or classes of similar objects. For example, the system may, having identified that the virtual model of a pickaxe slips out of the user's hand, identify a grip structure that could be added to the area of the pickaxe where the user was observed to hold the virtual model of the pickaxe. In another example, the system may, having detected flight irregularities in a virtual model of an airframe, identify wing structures that have overcome such flight irregularities in the past. The system may then suggest an edit, which may comprise a modification of the virtual model to incorporate the identified potential solutions to one or more users within the mixed reality experience, for example through a virtual text, audio, and/or graphical prompt overlaid onto the vision of one or more users, and/or by adding a translucent shadow version or wireframe of the solution onto the virtual model along with displaying to the one or more users an option to select and integrate the suggested edits.

In some embodiments of the invention, the system may integrate one or more edits into the virtual model. Responsive to the one or more users accepting the suggested edits, the system may incorporate the suggested edits into the virtual model, such that the structures, material changes, design changes, et cetera are reflected in the virtual model. The system may utilize a versioning paradigm to track the different versions of the virtual model after each successive round of edits and enable users to access any prior version of the virtual model.

In some embodiments of the invention, the system may continue to monitor the interactions between the user or users and the edited virtual model in the mixed reality environment in order to determine whether the edits improve the performance of the virtual model in its intended use and/or overcome the predicted deficiencies, or if the edit produces no change or creates new deficiencies. If the system identifies no change or new deficiencies related to the edits, the system may remove the edits and walk back the virtual model to a previous version, responsive to user authorization. The system may update the knowledge corpus with the results of the monitoring, so that the machine learning model may be retrained to reflect the information acquired regarding the efficacy of the applied solution and adjust its pattern recognition accordingly.

In some embodiments of the invention, the system may print the object based on the edited virtual model. The system may operate a 3D printer to construct the object based on the edited model, utilizing the specified material, and using it to build the design laid out in the virtual model.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

The following described exemplary embodiments provide a system, method, and program product to render a 3D model of a physical object in mixed reality, predict performance of the object by simulating the usage context of the object, edit the 3D model based on the prediction, and print the object based on the edited 3D model.

Figure 1:
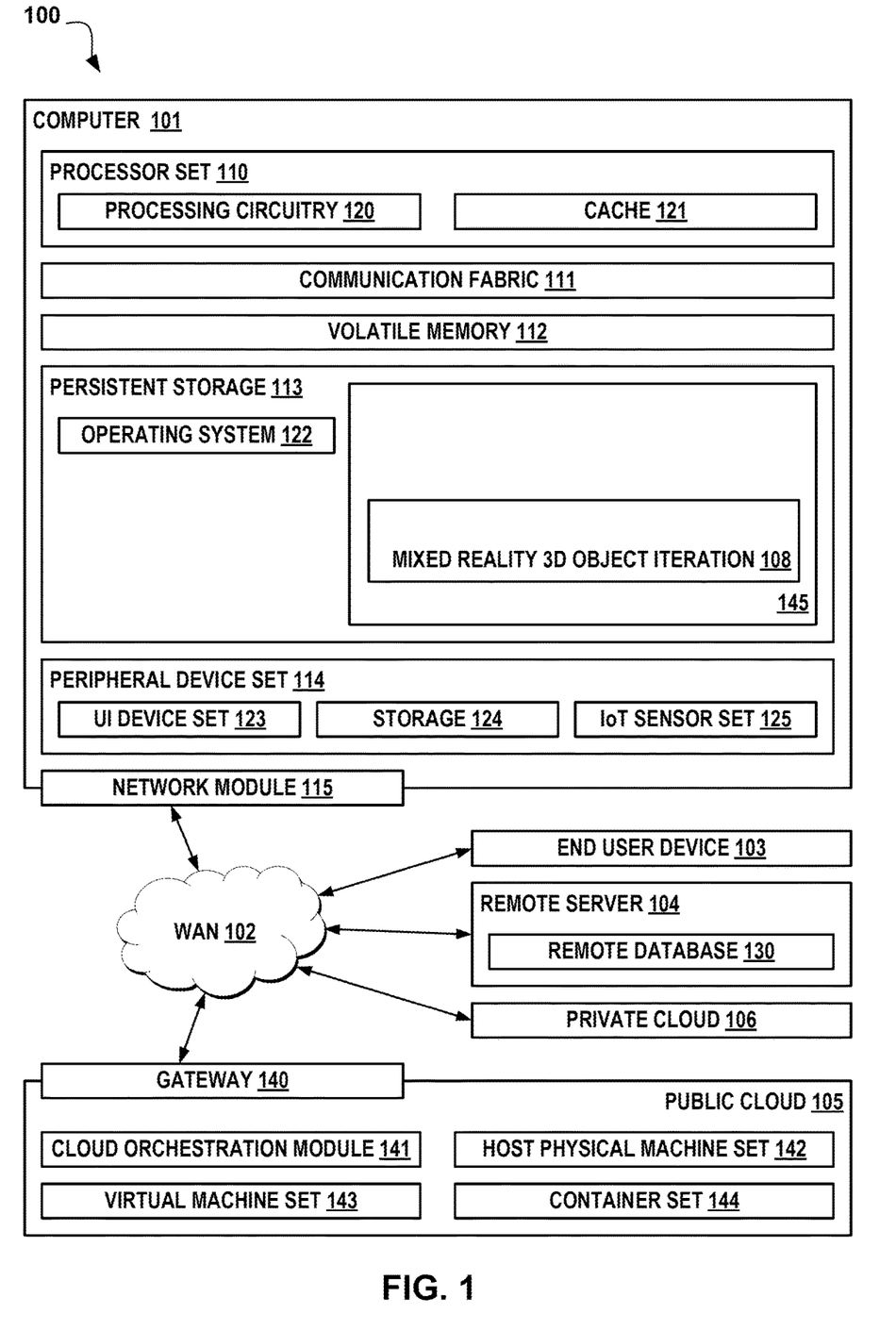
FIG. 1 illustrates an exemplary networked computer environment according to at least one embodiment.

Referring now to FIG. 1, computing environment 100 contains an example of an environment for the execution of at least some of the computer code involved in performing the inventive methods, such as code block 145, which may comprise mixed-reality 3D object iteration program 108. In addition to code block 145, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and code block 145, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in code block 145 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in code block 145 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, mixed reality devices, wearable devices (such as goggles, virtual reality headsets, augmented reality headsets, and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector. Peripheral device set 114 may further comprise three-dimensional printers, which may be devices that utilize a computer-controlled extrusion device to deposit material in specific patterns on a substrate to create a three-dimensional object from a virtual model.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

According to the present embodiment, the mixed-reality 3D object iteration program 108 may be a program enabled to render a 3D model of a physical object in mixed reality, predict performance of the object by simulating the usage context of the object, edit the 3D model based on the prediction, and print the object based on the edited 3D model. The mixed-reality 3D object iteration program 108 may, when executed, cause the computing environment 100 to carry out a mixed-reality 3D object iteration process 200. The mixed-reality 3D object iteration process 200 may be explained in further detail below with respect to FIG. 2. In embodiments of the invention, the mixed-reality 3D object iteration program 108 may be stored and/or run within or by any number or combination of devices including computer 101, end user device 103, remote server 104, private cloud 106, and/or public cloud 105, peripheral device set 114, and server 112 and/or on any other device connected to WAN 102. Furthermore, mixed-reality 3D object iteration program 108 may be distributed in its operation over any number or combination of the aforementioned devices.

Figure 2:
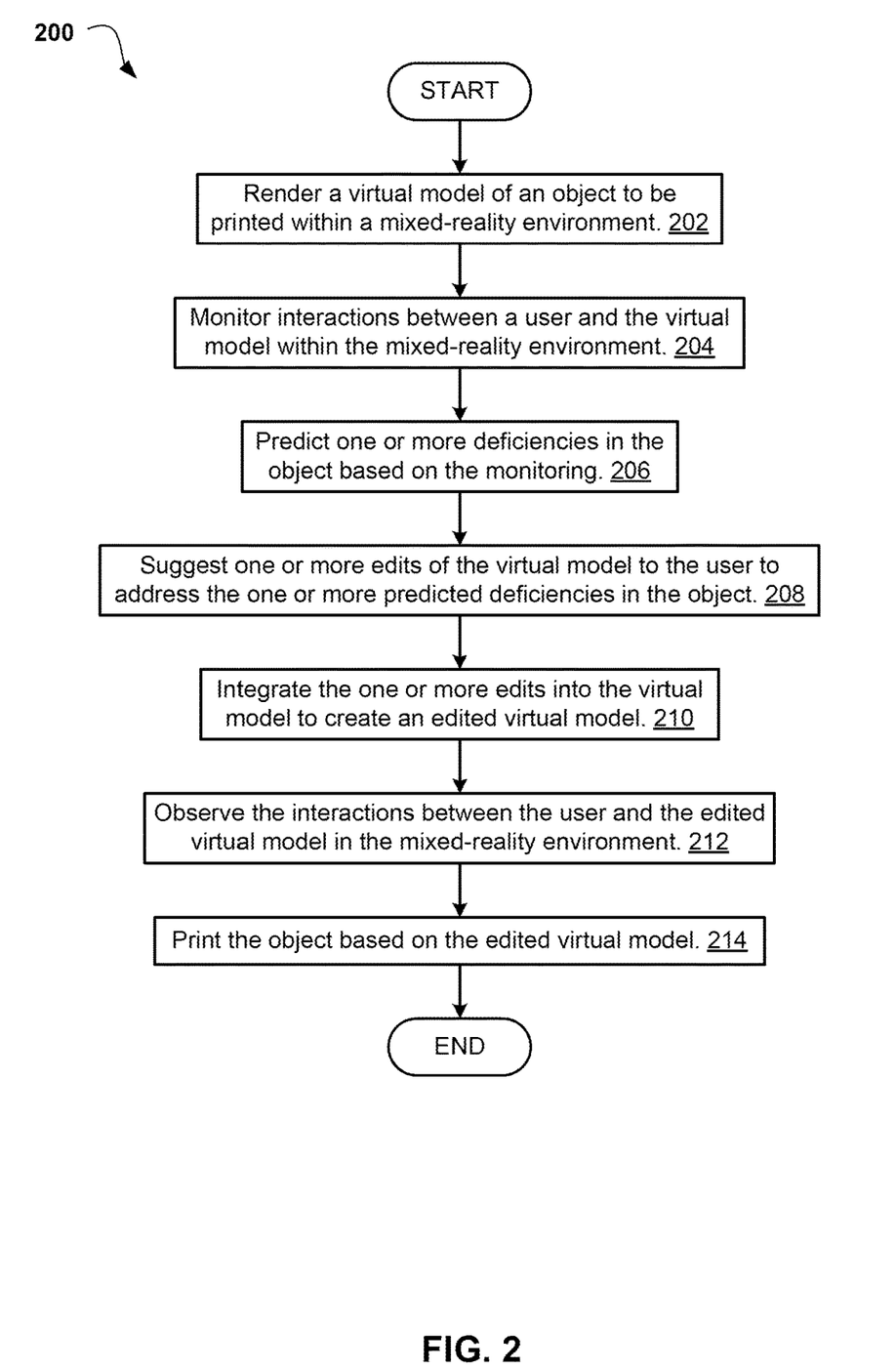
FIG. 2 is an operational flowchart illustrating a mixed-reality 3D object iteration process according to at least one embodiment.

Referring now to FIG. 2, an operational flowchart illustrating a mixed-reality 3D object iteration process 200 is depicted according to at least one embodiment. At 202, the mixed-reality 3D object iteration program 108 renders a virtual model of an object to be printed within a mixed-reality environment. The mixed-reality 3D object iteration program 108 may render the virtual model of the object to be printed in a mixed reality environment by simulating the virtual model within the mixed reality environment as a virtual object which any and/or all users within the mixed reality environment can see, manipulate, move, and modify. In some embodiments of the invention, the mixed-reality environment may comprise multiple copies of the virtual model. In some embodiments of the invention, the virtual model may be manipulated by any participating users employing interface devices such as controllers and may be increased or reduced in size. The virtual model may be visually separated into its component layers or slices to allow users to see the internal surfaces and structures of the virtual model, for example by pulling out individual layers or by spacing out the layers to create an "exploded" view of the virtual model. In some embodiments, users may create a copy of the virtual model, which may be updated to reflect all edits made to the virtual model or all copies of the virtual model by other users in real time or near-real-time. In some embodiments, the mixed-reality 3D object iteration program 108 may store one or more versions of the virtual model, where each version represents edits made to the virtual model and/or copies of the virtual model within a discrete segment of time and/or by a specific user or group of users.

At 204, the mixed-reality 3D object iteration program 108 monitors interactions between a user and the virtual model within the mixed-reality environment. The mixed-reality 3D object iteration program 108 may monitor how the user or user interacts with the virtual model within the mixed reality environment. The device may retrieve usage context from a pre-provided document. The device may infer the intended usage context of the object from the name of the object by matching the name of the object against a pre-provided database which comprises a list of known objects and the usage context associated with their use. The mixed-reality 3D object iteration program 108 may, responsive to identifying the usage context, modify the virtual environment to simulate the usage context of the physical object. The mixed-reality 3D object iteration program 108 may, in some embodiments of the invention, request that a user interact with or employ the tool in the manner that it is designed to be interacted with or employed in carrying out its function, for example through audible, graphical, and/or textual prompts overlaid onto the user's vision within the mixed reality environment. The mixed-reality 3D object iteration program 108 may monitor the movement of the user by tracking the user's movements via microlocation data from sensors integrated into the mixed reality device, and track the location and movement of the virtual model in relation to the user for at least the duration of time that the user is holding and/or regularly interacting with the virtual model. The mixed-reality 3D object iteration program 108 may monitor where and how the user holds, touches, or otherwise interacts with the virtual model, what surfaces, objects and materials in the environment the virtual model comes into contact with, the force with which the model is moved and/or collides with other objects or surfaces in the environment, effects of wind and air resistance on the virtual models, et cetera.

At 206, the mixed-reality 3D object iteration program 108 predicts one or more deficiencies in the physical object based on the monitoring. The mixed-reality 3D object iteration program 108 may predict deficiencies in the object by monitoring the interactions between the user or users and the virtual model in the mixed reality environment. The mixed-reality 3D object iteration program 108 may identify risks to the safety of human operators, for example by identifying potential safety hazards such as sharp edges or moving parts of the virtual model that are within a threshold distance of a region of the virtual model where the mixed-reality 3D object iteration program 108 observes the user to hold or interact with the virtual model. The mixed-reality 3D object iteration program 108 may identify weaknesses in structural elements of the invention, for example by simulating the forces at work on the virtual model during its intended use and compare those forces against the strength of the materials and structures comprising the virtual model. The mixed-reality 3D object iteration program 108 may identify drawbacks in the performance of the virtual model, such as where the user fails to execute the intended function; for example, if the virtual model is a pickaxe which collides with a mine ceiling and does not have room to swing in a standard-sized mining shaft, or repeatedly slips out of the user's hands, or is not pointed enough to concentrate sufficient force from a swing to crack the material it strikes. The safety risks, weaknesses, performance drawbacks, et cetera identified in the virtual model may be collectively referred to as deficiencies. The mixed-reality 3D object iteration program 108 may use artificial intelligence in identifying the deficiencies by utilizing a machine learning model to ingest the data gathered by monitoring the user's interactions with the virtual model in the mixed reality environment; the machine learning model may be trained to identify connections between the usage context of the object, the interactions between the users and the virtual model, and deficiencies which have been identified in the past. The machine learning model may be trained on a knowledge corpus comprising historical objects and their usage context, user interaction data, and identified deficiencies. The mixed-reality 3D object iteration program 108 may utilize a different machine learning model for each object or class of similar objects associated with the virtual model.

At 208, the mixed-reality 3D object iteration program 108 suggests one or more edits of the virtual model to the user to address the one or more predicted deficiencies in the object. The mixed-reality 3D object iteration program 108 suggests edits to the virtual model to one or more users participating in the mixed reality environment based on the identified deficiencies. The mixed-reality 3D object iteration program 108 may employ the machine learning model to identify connections between the identified deficiencies and structures, materials, design changes, and other potential solutions that have historically addressed the identified deficiencies in the past, for example with respect to similar objects or classes of similar objects. The mixed-reality 3D object iteration program 108 may then suggest an edit, which may comprise a modification of the virtual model to incorporate the identified potential solutions to one or more users within the mixed reality experience, for example through a virtual text, audio, and/or graphical prompt overlaid onto the vision of one or more users, and/or by adding a translucent shadow version or wireframe of the solution onto the virtual model along with displaying to the one or more users an option to select and integrate the suggested edits.

At 210, the mixed-reality 3D object iteration program 108 integrates the one or more edits into the virtual model to create an edited virtual model. Responsive to the one or more users accepting the suggested edits, the mixed-reality 3D object iteration program 108 may incorporate the suggested edits into the virtual model, such that the structures, material changes, design changes, et cetera are reflected in the virtual model. The mixed-reality 3D object iteration program 108 may utilize a versioning paradigm to track the different versions of the virtual model after each successive round of edits and enable users to access any prior version of the virtual model.

At 212, the mixed-reality 3D object iteration program 108 monitors the interactions between the user and the edited virtual model in the mixed reality environment. The mixed-reality 3D object iteration program 108 may continue to observe the interactions between the user or users and the edited virtual model in the mixed reality environment in order to determine whether the edits improve the performance of the virtual model in its intended use and/or overcome the predicted deficiencies, or if the edit produces no change or creates new deficiencies. If the mixed-reality 3D object iteration program 108 identifies no change or new deficiencies related to the edits, the mixed-reality 3D object iteration program 108 may remove the edits and walk back the virtual model to a previous version, responsive to user authorization. The mixed-reality 3D object iteration program 108 may update the knowledge corpus with the results of the monitoring, so that the machine learning model may be retrained to reflect the information acquired regarding the efficacy of the applied solution and adjust its pattern recognition accordingly.

At 214, the mixed-reality 3D object iteration program 108 prints the object based on the edited virtual model. The mixed-reality 3D object iteration program 108 may print the object based on the edited virtual model. The mixed-reality 3D object iteration program 108 may operate a 3D printer to construct the object based on the edited model, utilizing the specified material, and using it to build the design laid out in the virtual model.

It may be appreciated that FIG. 2 provides only an illustration of one implementation and does not imply any limitations with regard to how different embodiments may be implemented. Many modifications to the depicted environments may be made based on design and implementation requirements.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for iteratively improving a virtual model of an object to be printed in a mixed reality environment, the method comprising:
rendering the virtual model within the mixed-reality environment;
monitoring interactions between a user and the virtual model within the mixed-reality environment;
predicting one or more deficiencies in the object based on the monitoring;
suggesting, by a machine learning model, one or more edits of the virtual model to the user to address the one or more predicted deficiencies, wherein the one or more edits represent one or more modifications to a structure or material of the object; and
integrating the one or more edits into the virtual model.

2. The method of claim 1, wherein the predicting is performed by the machine learning model trained on a knowledge corpus.

3. The method of claim 2, further comprising:
observing one or more interactions between the user and the edited virtual model in the mixed reality environment; and updating the knowledge corpus based on the observing.

4. The method of claim 1, further comprising:
responsive to a user selection, modifying the virtual model to visually represent a deposition pattern associated with a type of 3D printing process or a model of 3D printer.

5. The method of claim 1, the rendering comprising:
modifying the mixed-reality environment with one or more virtual elements comprising a usage context associated with the object.

6. The method of claim 1, further comprising:
printing the object based on the edited virtual model.

7. The method of claim 1, wherein the virtual model comprises one or more individually manipulable horizontal layers.

8. A computer system for iteratively improving a virtual model of an object to be printed in a mixed reality environment, the computer system comprising:
one or more processors, one or more computer-readable memories, one or more 3D printers, one or more mixed-reality devices, one or more computer-readable tangible storage medium, and program instructions stored on at least one of the one or more tangible storage medium for execution by at least one of the one or more processors via at least one of the one or more memories, wherein the computer system is capable of performing a method comprising:
- rendering the virtual model within the mixed-reality environment;
- monitoring interactions between a user and the virtual model within the mixed-reality environment;
- predicting one or more deficiencies in the physical object based on the monitoring;
- suggesting, by a machine learning model, one or more edits of the virtual model to the user to address the one or more predicted deficiencies, wherein the one or more edits represent one or more modifications to a structure or material of the object; and
- integrating the one or more edits into the virtual model.

9. The computer system of claim 8, wherein the predicting is performed by the machine learning model trained on a knowledge corpus.

10. The computer system of claim 9, further comprising:
observing one or more interactions between the user and the edited virtual model in the mixed reality environment; and
updating the knowledge corpus based on the observing.

11. The computer system of claim 8, further comprising:
responsive to a user selection, modifying the virtual model to visually represent a deposition pattern associated with a type of 3D printing process or a model of 3D printer.

12. The computer system of claim 8, the rendering comprising:
populating the mixed-reality environment with one or more elements comprising a usage context associated with the object.

13. The computer system of claim 8, further comprising: printing the object based on the edited virtual model.

14. The computer system of claim 8, wherein the virtual model comprises one or more individually manipulable horizontal layers.

15. A computer program product for iteratively improving a virtual model of an object to be printed in a mixed reality environment, the computer program product comprising: one or more computer-readable tangible storage medium and program instructions stored on at least one of the one or more tangible storage medium, the program instructions executable by a processor to cause the processor to perform a method comprising:
- rendering the virtual model within the mixed-reality environment;
- monitoring interactions between a user and the virtual model within the mixed-reality environment;
- predicting one or more deficiencies in the physical object based on the monitoring;
- suggesting, by a machine learning model, one or more edits of the virtual model to the user to address the one or more predicted deficiencies, wherein the one or more edits represent one or more modifications to a structure or material of the object; and
- integrating the one or more edits into the virtual model.

16. The computer program product of claim 15, wherein the predicting is performed by the machine learning model trained on a knowledge corpus.

17. The computer program product of claim 16, further comprising:
observing one or more interactions between the user and the edited virtual model in the mixed reality environment; and updating the knowledge corpus based on the observing.

18. The computer program product of claim 15, further comprising:
responsive to a user selection, modifying the virtual model to visually represent a deposition pattern associated with a type of 3D printing process or a model of 3D printer.

19. The computer program product of claim 15, the rendering comprising:
populating the mixed-reality environment with one or more elements comprising a usage context associated with the object.

20. The computer program product of claim 15, further comprising:
printing the object based on the edited virtual model.

* * * * *